US012747941B2

(12) United States Patent
Chung et al.

(10) Patent No.: US 12,747,941 B2
(45) Date of Patent: Sep. 29, 2026

(54) SEMICONDUCTOR MEASUREMENT SYSTEM HAVING MONOCHROMATOR AND OPERATING METHOD THEREOF

(71) Applicant: SAMSUNG ELECTRONICS CO., LTD., Suwon-si (KR)

(72) Inventors: Dongyun Chung, Suwon-si (KR); Sinyong Lee, Suwon-si (KR); Jiyoung Chu, Suwon-si (KR); Ingi Kim, Suwon-si (KR); Minhwan Seo, Suwon-si (KR); Hyungjin Kim, Suwon-si (KR); Sangwoo Bae, Suwon-si (KR); Akinori Okubo, Suwon-si (KR); Jungchul Lee, Suwon-si (KR); Jaeho Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 18/894,860

(22) Filed: Sep. 24, 2024

(65) Prior Publication Data

US 2025/0264324 A1 Aug. 21, 2025

(30) Foreign Application Priority Data

Feb. 15, 2024 (KR) ........................ 10-2024-0022065

(51) Int. Cl.
*G01B 11/02* (2006.01)

(52) U.S. Cl.
CPC .................................... *G01B 11/02* (2013.01)

(58) Field of Classification Search
CPC ....... G01B 11/02; G01N 21/25; G01J 3/0208; G01J 3/0218; G01J 3/0224; G01J 3/0227; G01J 3/18
See application file for complete search history.

(56) References Cited

U.S. PATENT DOCUMENTS 5,233,405 A 8/1993 Wildnauer et al.
6,177,992 B1 * 1/2001 Braun ..................... G01J 3/447 356/327
6,646,739 B2 11/2003 Kaneko
7,116,848 B2 * 10/2006 He ....................... G02B 5/3025 385/11
8,213,011 B2 7/2012 Farsaie et al.
9,638,635 B2 5/2017 Acher et al.
9,921,104 B2 * 3/2018 Krishnan ............. G01N 21/255
(Continued)

FOREIGN PATENT DOCUMENTS

KR 10-2021-0024299 A 3/2021
WO 2017/214314 A1 12/2017

*Primary Examiner* — Jonathan M Hansen
(74) *Attorney, Agent, or Firm* — Sughrue Mion, PLLC

(57) ABSTRACT

Provided is a semiconductor measurement system including a laser configured to output a light having multiple wavelengths, a broadband spectrometer configured to receive the light and output monochromatic light having a single wavelength, a measurement device configured to obtain physical information of a sample based on the monochromatic light, and a computing device configured to inspect or measure the sample based on the obtained physical information, wherein the broadband spectrometer is further configured to remove polarization dependence of the light based on a wavelength and a polarization separating/combining device.

17 Claims, 8 Drawing Sheets

(56) References Cited

U.S. PATENT DOCUMENTS

| | | | | |
|---|---|---|---|---|
| 10,061,083 | B2 | 8/2018 | Mclaughlin | |
| 11,268,853 | B2 | 3/2022 | Chen et al. | |
| 2001/0030745 | A1 | 10/2001 | He et al. | |
| 2002/0063959 | A1 | 5/2002 | Yamamoto | |
| 2005/0094934 | A1* | 5/2005 | He | G02B 5/3025<br>385/24 |
| 2005/0179895 | A1* | 8/2005 | Puppels | G01J 3/447<br>356/327 |
| 2007/0019194 | A1* | 1/2007 | Chen | G01J 3/02<br>356/328 |

* cited by examiner

SEMICONDUCTOR MEASUREMENT SYSTEM HAVING MONOCHROMATOR AND OPERATING METHOD THEREOF

CROSS-REFERENCE TO RELATED APPLICATION(S)

This application claims priority to Korean Patent Application No. 10-2024-0022065, filed on Feb. 15, 2024, in the Korean Intellectual Property Office, the disclosure of which is incorporated by reference herein in its entirety.

BACKGROUND

1. Field

Embodiments of the present disclosure relate to a physical unclonable function circuit, a security circuit having the same, and a method of operating the same.

2. Description of Related Art

In semiconductor manufacturing processes, optical measurement instruments such as Spectroscopic Reflectometry (SR) and Spectroscopic Ellipsometry (SE) may be widely used. The optical measurement instruments mentioned above may more precisely measure dimensions (Dimension) such as film thickness of semiconductor circuit structures formed on silicon substrates and optical constants such as refractive index. These optical measurement instruments are also referred to as Optical Critical Dimension (OCD) measurement devices, which compare measurement results with simulation results using models of semiconductor circuit structures and derive dimensions or optical constants of constituent materials by fitting. Broadband spectrometers generally refer to scientific instruments that measure the absorption, reflection, or transmission of light within a wide spectrum range. Broadband spectrometers measure the intensity of light and generate spectrum data across various wavelength ranges. Broadband spectrometers generally consist of spectroscopic components that disperse light into various wavelengths and detectors.

SUMMARY

One or more embodiments provide a semiconductor measurement system eliminating wavelength/polarization dependence and an operating method thereof.

According to an aspect of one or more embodiments, there is provided a semiconductor measurement system including a monochromator including a first wavelength control device configured to separate a collimated beam including multiple wavelengths into a plurality of wavelength bands, a second wavelength control device configured to receive diffracted light beams corresponding to the plurality of wavelength bands and output one of the diffracted light beams as a collimated beam of a single wavelength, first polarization optics configured to separate respective separated light beams corresponding to the plurality of wavelength bands into two polarization beams orthogonal to each other and match polarization directions of the separated polarization beams, second polarization optics configured to output the diffracted light beams corresponding to the plurality of wavelength bands by separating each of the diffracted light beams having the matched polarization direction into two polarization beams orthogonal to each other and combining the separated polarization beams, and a multi-grating mount including diffraction gratings configured to output the diffracted light beams having the matched polarization direction by diffracting each of the polarization beams having the matched polarization direction output from the first polarization optics.

According to another aspect of one or more embodiments, there is provided a semiconductor measurement system including a monochromator including an incident light unit configured to receive incident light of multiple wavelengths, a light splitting unit configured to split the incident light of the multiple wavelengths into light beams corresponding to a plurality of wavelength bands, and an emitted light unit configured to output one of the split light beams as emitted light of a single wavelength, wherein the light splitting unit includes a wavelength control device configured to output separated collimated beams into areas respectively corresponding to the plurality of wavelength bands or combine diffracted light beams corresponding to the plurality of wavelength bands, polarization optics configured to separate each of the collimated beams into orthogonal polarization beams, match polarization directions of the separated polarization beams, and output diffracted light beams of the same wavelength in different optical paths as diffracted light beams having polarization beams orthogonal to each other, and a multi-grating mount having a plurality of diffraction gratings respectively corresponding to the plurality of wavelength bands, the plurality of diffraction gratings being configured to diffract the collimated beams having the matched polarization direction.

According to still another aspect of one or more embodiments, there is provided a semiconductor measurement system including a laser configured to output a light having multiple wavelengths, a broadband spectrometer configured to receive the light and output monochromatic light having a single wavelength, a measurement device configured to obtain physical information of a sample based on the monochromatic light, and a computing device configured to inspect or measure the sample based on the obtained physical information, wherein the broadband spectrometer is further configured to remove polarization dependence of the light based on a wavelength and a polarization separating/combining device.

According to further still another aspect of one or more embodiments, there is provided an operating method of a monochromator, the operating method including selecting a polarization direction corresponding to monochromatic light of a single wavelength, receiving a light of multiple wavelengths, and outputting the monochromatic light using a multi-grating mount including diffraction gratings configured to diffract collimated beams in the polarization direction, wherein the monochromatic light is output by splitting the light of the multiple wavelengths based on a wavelength and a polarization separating/combining device.

BRIEF DESCRIPTION OF DRAWINGS

The above and other aspects, features, and advantages of embodiments will be more clearly understood from the following detailed description, taken in conjunction with the accompanying drawings, in which.

DETAILED DESCRIPTION

Figure 1:
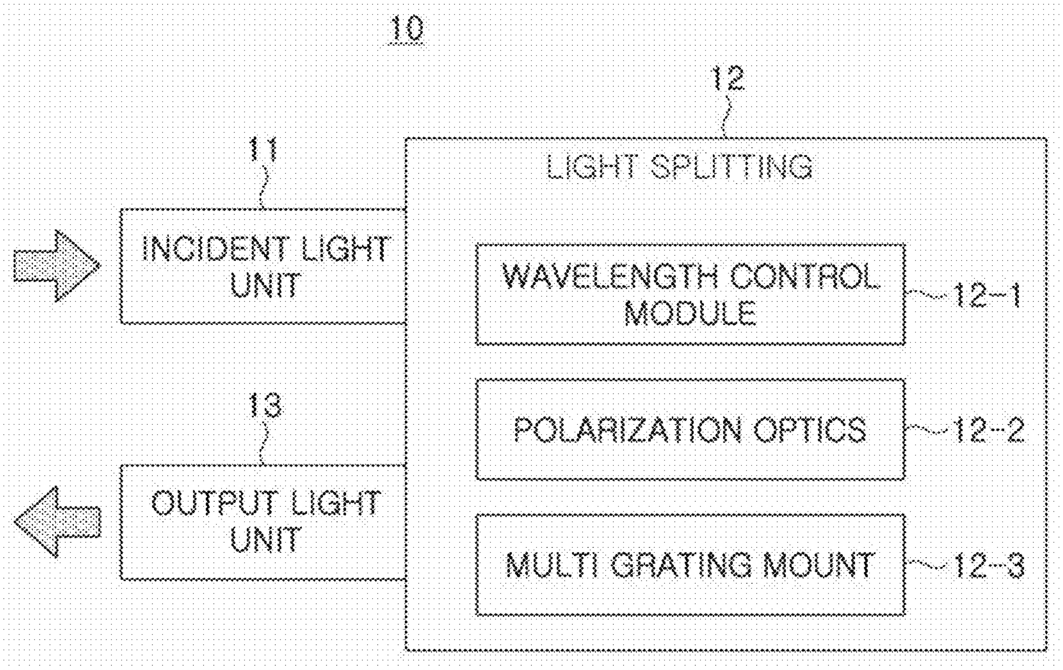
FIG. 1 is a diagram illustrating a monochromator according to one or more embodiments.

Hereinafter, embodiments will be described in detail using the drawings. Embodiments described herein are example embodiments, and thus, the disclosure is not limited thereto.

It will be understood that, although the terms first, second, third, fourth, etc. may be used herein to describe various elements, components, regions, layers and/or sections (collectively "elements"), these elements should not be limited by these terms. These terms are only used to distinguish one element from another element. Thus, a first element described in this description section may be termed a second element or vice versa in the claim section without departing from the teachings of the disclosure.

It will be understood that when an element or layer is referred to as being "over," "above," "on," "below," "under," "beneath," "connected to" or "coupled to" another element or layer, it may be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

In accordance with one or more embodiments, a semiconductor measurement system with a monochromator and operating method thereof may separate only the desired wavelengths using diffracted light from a diffraction grating for broadband optical input and may output the separated monochromatic light.

A monochromator using a diffraction grating may separate light into various wavelengths and selectively extract one specific wavelength. Monochromators primarily receive light of various wavelengths from a source such as a blackbody or a light source. The incident angle of the input light incident on the diffraction grating may be adjusted using the monochromator. By adjusting the incident angle, the monochromator causes light of a specific wavelength to diffract at a specific angle on the diffraction grating. The diffraction grating separates light into different wavelengths using this method. The surface of the diffraction grating may include high-density fine grooves or spacing. When light passes through these gratings, light of various wavelengths may be diffracted at different angles. The fine spacing and patterns of the diffraction grating determine the size of the separated wavelengths. Light passing through the diffraction grating is separated at various angles. A detector detects where light of a specific wavelength reaches and converts that information into a signal. Slits selectively allow only light of a specific wavelength to pass through. By adjusting the size and position of the slits, light of the desired wavelength may be selectively extracted. When light of the selected wavelength passes through the slits, is the light may be transmitted to the detector, resulting in obtaining a spectrum or a light signal of a specific wavelength.

According to one or more embodiments, a monochromator may include diffraction gratings for each wavelength band, a multi-grating mount, a polarizing optical element, and a wavelength control module. The monochromator according to one or more embodiments may increase the grating bandwidth and the number of gratings for broadband monochromator operation. The monochromator according to one or more embodiments may be implemented by separating diffracted light by a diffraction grating for broadband optical input.

The intensity of outgoing light may be determined by the diffraction efficiency (DE) of the grating. The diffraction efficiency (DE) of each grating may have wavelength and polarization dependencies depending on the medium and shape of the reflecting surface of the grating (such as groove density, blazed angle, etc.). Due to constraints of grating bandwidth, broadband monochromators use multiple gratings corresponding to each wavelength band. Generally, broadband monochromators use a turret-type grating mount. The broadband monochromator according to one or more embodiments may expand the bandwidth of each grating by adding a polarizing optical element to a broadband monochromator. Additionally, the broadband monochromator according to one or more embodiments may enable continuous wavelength scanning without additional time delay during grating replacement by utilizing a wavelength control module and a multi-grating module.

FIG. 1 is a diagram illustrating a monochromator 10 according to one or more embodiments. Referring to FIG. 1, the monochromator 10 may include an incident light unit 11, a light splitting unit 12, and an emitted light unit 13.

The incident light unit 11 may receive light having a plurality of wavelengths through an optical fiber. The incident light unit 11 may convert light from the incident optical fiber into a collimated beam.

The light splitting unit 12 may be implemented to output incident light as monochromatic light using a diffraction grating. The light splitting unit 12 may include a wavelength control device 12-1, polarization optics 12-2, and a multi-grating mount 12-3.

The wavelength control device 12-1 may be implemented to output separated collimated beams into spaces (areas) respectively corresponding to a plurality of wavelength bands or to combine diffracted light beams corresponding to the plurality of wavelength bands. In one or more embodiments, the wavelength control device 12-1 may include a wavelength separating device that separates the collimated beams into the spaces (areas) corresponding to the plurality of wavelength bands, and a wavelength combining device that combines the diffracted light beams corresponding to the plurality of wavelength bands. The wavelength control device 12-1 may be implemented to separate broadband incident light into a plurality of wavelength bands.

The polarization optics 12-2 may be implemented to respectively separate the collimated beams into orthogonal polarization beams, match polarization directions of the separated polarization beams, and output diffracted light beams of the same wavelength in different optical paths as diffracted light beams having polarization beams orthogonal to each other. The polarization optics 12-2 may separate the light separated into each wavelength band into two orthogonal polarization beams (P-polarization and S-polarization). Thereafter, the polarization optics 12-2 may adjust the light for each polarization to have a favorable polarization (P-polarization or S-polarization) in a grating.

The multi-grating mount 12-3 may be implemented to include a plurality of diffraction gratings that respectively correspond to the plurality of wavelength bands and diffract the collimated beams having the matched polarization direction. In one or more embodiments, the multi-grating mount 12-3 may further include a rotation stage that rotates each of the plurality of diffraction gratings. In addition, the light beams separated while passing through the wavelength control device 12-1 and the polarization optics 12-2 may be incident on the grating, and then the diffracted light may be transmitted as emitted light while again passing through the polarization optics 12-2 and the wavelength control device 12-1. At this time, each diffraction grating may be located on one plane, for example, on the multi-grating mount 12-3. Each diffraction grating may be placed to be on several planes with different angle of incidences (AOIs) while sharing the same axis of rotation. Scanning of all the wavelength bands may be possible by rotating the multi-grating mount 12-3 without the need for additional grating switching.

The emitted light unit 13 may output light having the selected wavelength through the optical fiber. Here, the output light may be light of 250 nm to 1100 nm, and a wavelength band that is greater than or less than 250 nm to 1100 nm according to a type of the diffraction grating and the optical fiber. The emitted light unit 13 may couple emitted collimated beam to an emitted optical fiber.

A general monochromator uses a plurality of gratings each having a wide bandwidth to respond to a broadband. When increasing a bandwidth of the grating, the polarization dependence of diffraction efficiency increases. This is an inappropriate characteristic as an optical critical dimension (OCD) light source, which measures a polarization change. In addition, a monochromator may use a turret mount to operate on the plurality of gratings, which may cause an additional switch time delay of a grating when changing a wavelength band used, which may cause a decrease in measurement throughput.

The monochromator 10 according to one or more embodiments adds the wavelength control device 12-1 and the optical polarization instrument 12-2, thereby eliminating the polarization dependence of incident polarization (or optimizing polarization of incident light). In addition, the monochromator 10 according to one or more embodiments may eliminate the grating switching time delay using the multi-grating mount 12-3.

Figure 2:
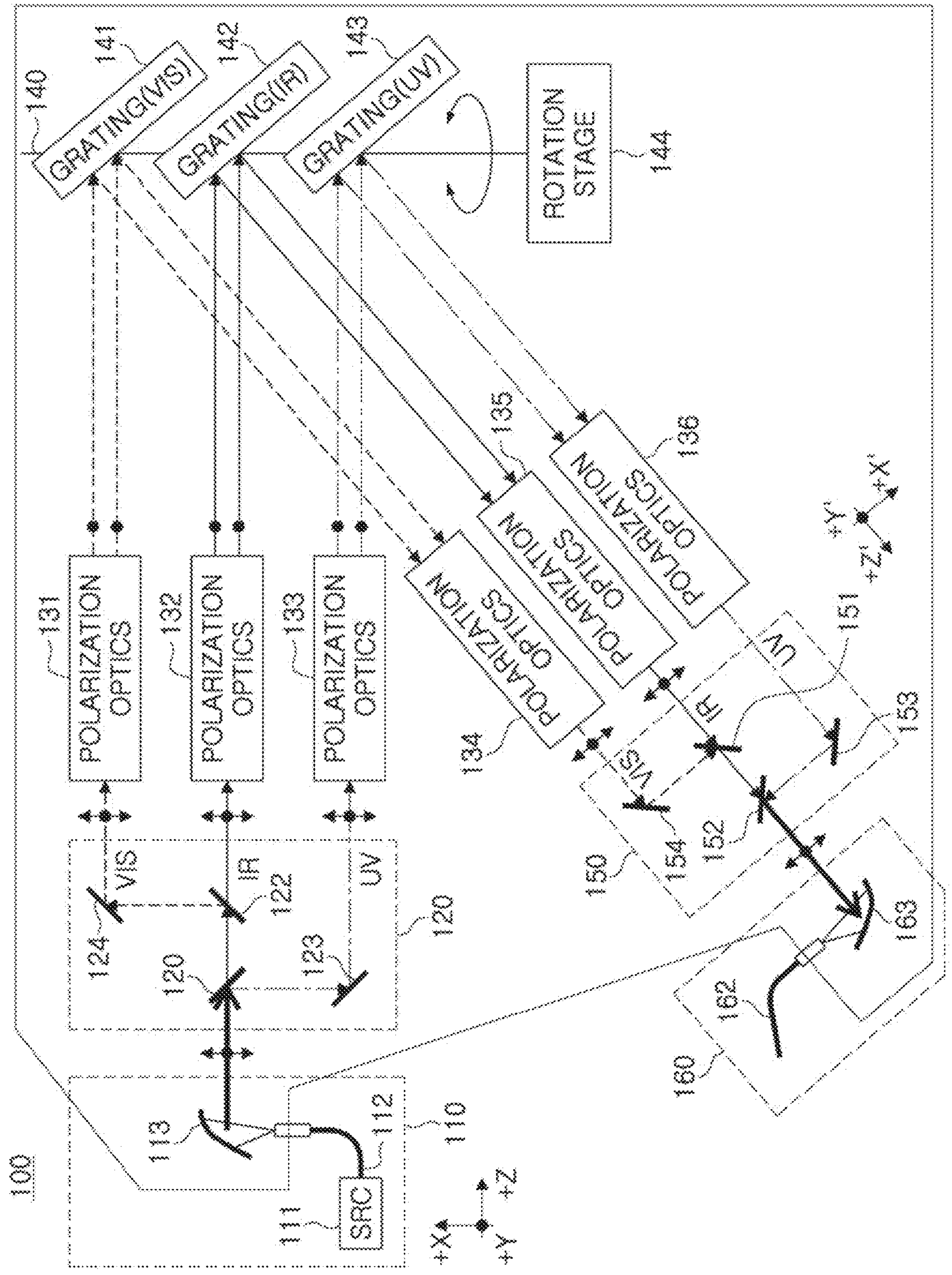
FIG. 2 is a diagram illustrating a monochromator according to one or more embodiments.

FIG. 2 is a diagram illustrating a monochromator 100 according to one or more embodiments. Referring to FIG. 2, the monochromator 100 may include an incident light unit 110, a wavelength separator 120, polarization optics 131, 132, 133, 134, 135, and 136, a multi-grating mount 140, a wavelength combiner 150, and an emitted light unit 160. Here, the wavelength separator 120, the polarization optics 131 to 136, the diffraction grating mount 140, and the wavelength combiner 150 may be collectively referred to as a light splitting unit. The light splitting unit may output multi-wavelength collimated beam that has passed through the incident light unit 110 as short-wavelength collimated beam. When the polarization dependence of a diffraction grating and incident light is relatively small or the transmittance of an optical polarization instrument is relatively low according to a wavelength band, the optical polarization instrument may be omitted.

The incident light unit 110 may include a light source 111, an optical fiber 112, and a collimator 113. The light source 111 may be implemented to generate broadband incident light having multiple wavelengths. The optical fiber 112 may receive the broadband incident light. The collimator 113 may output the light output from the optical fiber 112 to the wavelength separator 120 as collimated beam of multiple wavelengths.

The wavelength separator 120 may be implemented to separate the multi-wavelength incident light into two or more light beams having different wavelength bands. In one or more embodiments, the wavelength separator 120 may output separated light beams into first spaces (areas) corresponding to the plurality of wavelength bands using first bandpass filters 121 and 122 and first mirrors 123 and 124. The wavelength separator 120 may include the first bandpass filters 121 and 122 and the first mirrors 123 and 124. In one or more embodiments, each of the first mirrors 123 and 124 may be a dichroic mirror. When N or more wavelength separating devices are combined, N+1 spatially separated light beams having different wavelength bands may be formed. The light reflected from each wavelength separating device may be adjusted so that a traveling direction (+z-axis) is parallel to transmitted light by mirror reflection.

The light of each wavelength band spatially separated through the wavelength separator 120 may be light having the same polarization while passing through each of the corresponding polarization optics 131, 132, and 133. The light may be separated into two orthogonal polarization components (P-polarization or S-polarization) by the polarization optics 131, 132, and 133. Each of the separated light beams may be transmitted and reflected. A direction of the reflected light may be adjusted to be parallel with the traveling direction (+z-axis) of light by mirror reflection.

The light passing through the wavelength separator 120 and the polarization optics 131, 132, and 133 may be ultimately formed as 2 and N+1 spatially separated collimated beams of the same polarization in a horizontal (y-axis) direction and a vertical (x-axis) direction, respectively. In one or more embodiments, when using the three polarization optics 131, 132, and 133 for three wavelength bands of ultraviolet (UV), visible (VIS), and infrared (IR) bands, a total of 2*(2)+1)=6 collimated beams proceed.

Each of the separated light beams passing through the wavelength separator 120 and the polarization optics 131, 132, and 133 is incident on a multi-grating including a grating corresponding to each wavelength band. To obtain the maximum diffraction efficiency for each grating, the grating incident polarization may be optimized by changing an angle of a polarization controller of the optical polarization instrument. In a multi-grating unit, multiple gratings 141, 142, and 143 may be mounted in parallel on the multi-grating mount 140 fixed on one rotation stage 144. When the gratings 141, 142, and 143 mounted in parallel are configured with the same pitch and different blaze angles, monochromatic light corresponding to each grating wavelength band may be continuously dispersed according to the rotation of the rotation stage 144. The pitch refers to a distance between grating lines. The distance determines the characteristics of diffraction and affects the dispersion and emission of light of various wavelengths. The braze angle reflects and disperses light of a specific wavelength as efficiently as possible. The braze angle varies depending on a wavelength and affects the wavelength resolution and dispersion characteristics of a spectrometer. When mounting the multiple gratings 141, 142, and 143 on the multi-grating mount 140 to have different AOIs while sharing a rotation axis, the monochromatic light corresponding to each grating wavelength band may be continuously dispersed according to the rotation even in a combination of gratings with different pitches.

The wavelength combiner 150 may be implemented to combine different monochromatic light beams. In one or more embodiments, the wavelength combiner 150 may output diffracted light beams in second spaces (areas) corresponding to the plurality of wavelength bands as a collimated beam of a single wavelength using second bandpass filters 151 and 152 and second mirrors 153 and 154. The wavelength combiner 150 may include the second bandpass filters 151 and 152 and the second mirrors 153 and 154. In one or more embodiments, each of the second mirrors 153 and 154 may be a dichroic mirror. A total of 2(N+1) light beams incident and diffracted from each grating may pass through the polarization optics 134, 135, and 136 corresponding to the emitted light unit 160 and the wavelength combiner 150 in the reverse order of incidence and then be transmitted to the emitted light unit 160.

The emitted light unit 160 may include an optical fiber 162 and a collimator 163. The optical fiber 162 may output monochromatic light (collimated beam) of the collimator 163 to an external device. The collimator 163 may receive collimated beam of a single wavelength from the wavelength combiner 150. Due to light beams of different wavelength bands having different diffraction angles, only a specific wavelength component may pass through the polarization optics 134, 135, and 136 and the wavelength combiner 150 and then finally reach the optical fiber 162 through the emitted light unit 160.

Figure 3:
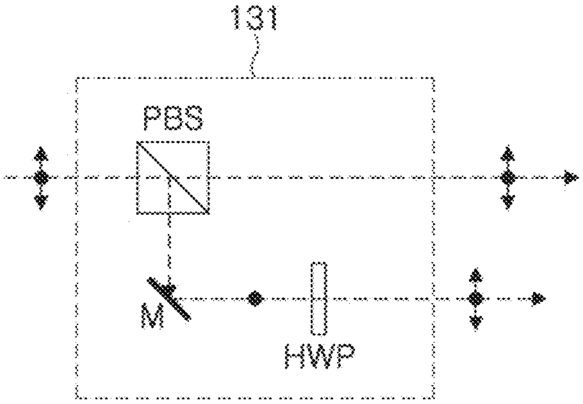
FIG. 3 is a diagram illustrating an optical polarization instrument according to one or more embodiments.

FIG. 3 is a diagram illustrating an optical polarization instrument according to one or more embodiments. The optical polarization instrument may include a polarizing beam splitter or a polarization combiner. Here, the polarizing beam splitter may be implemented to separate collimated beams into orthogonal polarization beams and match polarization directions of the separated polarization beams. The polarization combiner may be implemented to output diffracted light beams of the same wavelength in different optical paths as diffracted light beams having polarization beams orthogonal to each other. The optical polarization instrument 131 shown in FIG. 3 may include a polarizing beam splitter PBS, a mirror M, and a polarization controller HWP. The polarizing beam splitter PBS may include a polarization beam splitter. The polarization controller may include a half-wave plate. The polarization controller may match a polarization direction of transmitted light of the polarizing beam splitter PBS with a polarization direction of reflected light reflected from the mirror M. In one or more embodiments, the polarization direction may be manually determined. In other embodiments, the polarization direction may be automatically changed according to a wavelength.

Figure 4:
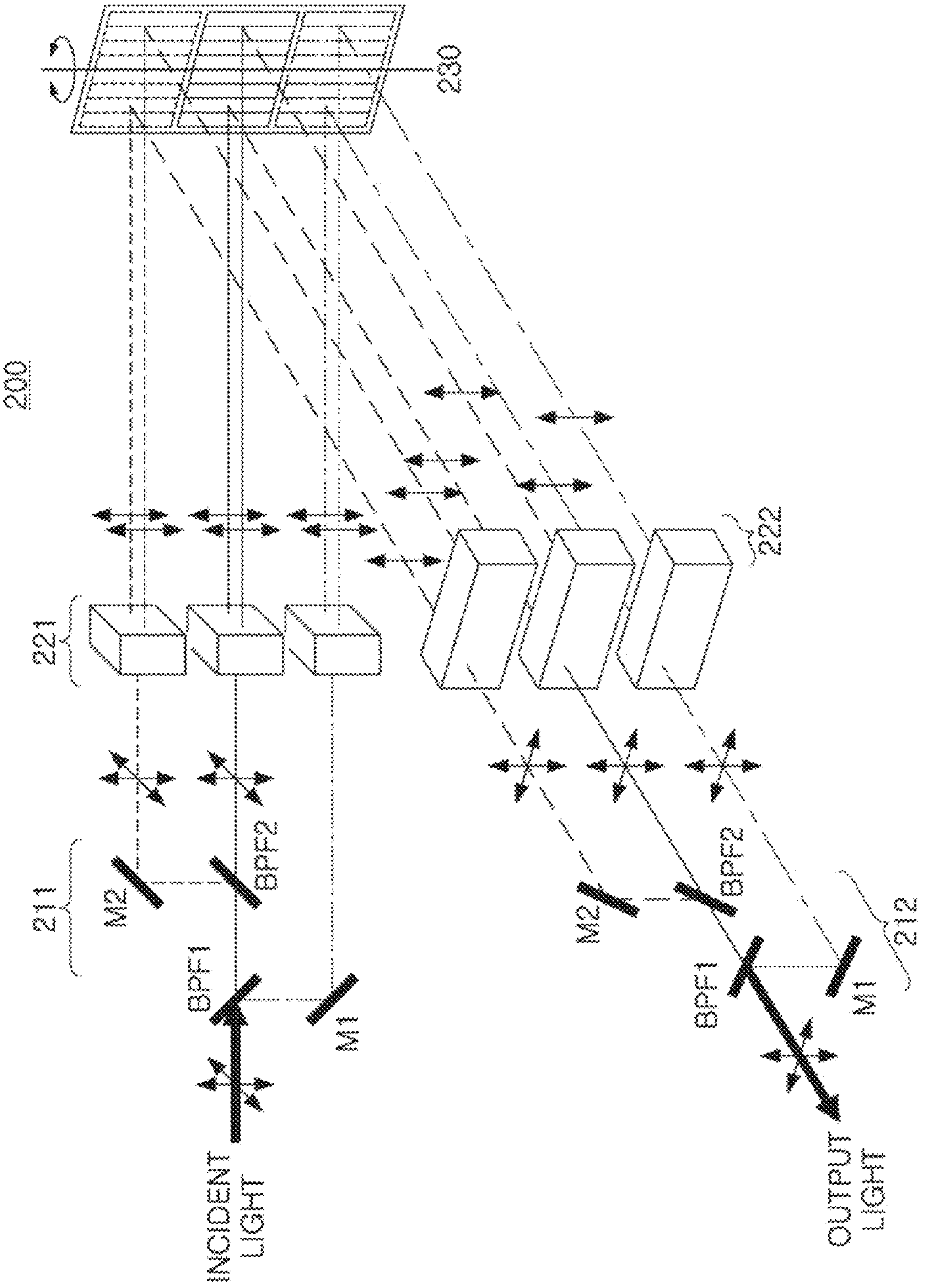
FIG. 4 is a diagram illustrating a broadband spectrometer according to one or more embodiments.

FIG. 4 is a diagram illustrating a broadband spectrometer 200 according to one or more embodiments. Referring to FIG. 4, the broadband spectrometer 200 may include a first wavelength control device 211, a second wavelength control device 212, first polarization optics 221, second polarization optics 222, and a multi-grating mount 230.

Each of the first wavelength control device 211 and the second wavelength control device 212 may include bandpass filters BPF1 and BPF2 and mirrors M1 and M2. In one or more embodiments, the first wavelength control device 211 may output separated light beams to first spaces (areas) corresponding to a plurality of wavelength bands using the at least one first bandpass filter BPF1/BPF2 and the at least one first mirror M1/M2. In one or more embodiments, the second wavelength control device 212 may output diffracted light beams of second spaces (areas) corresponding to the plurality of wavelength bands as collimated beams of a single wavelength using the at least one second bandpass filter BPF1/BPF2 and the at least one second mirror M1/M2.

Each of the first polarization optics 221 and second polarization optics 222 may include three polarization optics. In one or more embodiments, each of the first polarization optics 221 may include a polarizing beam splitter that outputs transmitted light and reflected light by separating collimated beam into polarization beams orthogonal to each other, a mirror that reflects the reflected light, a first polarization adjustor that adjusts polarization of the reflected light of the mirror, and a second polarization adjustor that adjusts polarization of the transmitted light of the polarizing beam splitter. In one or more embodiments, each of the second polarization optics 222 may include a first polarization adjustor that adjusts polarization of first diffracted light of a diffraction grating, a second polarization adjustor that adjusts polarization of second diffracted light of the diffraction grating, a mirror that reflects the adjusted polarization of the first polarization controller, and a polarization combiner that combines the polarization reflected from the mirror with the adjusted polarization of the second polarization controller.

A multi-wavelength light source incident through an optical fiber may spatially separate wavelength/polarization through wavelength separating/combining devices 211/212 and polarization separating/combining devices 221/222 the first and second wavelength control devices 211 and 212 and the first and second polarization optics 221 and 222. Such separated light beams may be incident on the corresponding gratings of the multi-grating mount 230. At this time, an angle of the polarization control device HWP of the polarizing beam splitter 221 may be rotated so that the separated light beams may be incident on the gratings as polarization having higher light efficiency according to an incident wavelength. The multi-grating mount 230 may be rotated in a plane vertical direction, and light may be split into the desired diffraction wavelength according to each angle. Such split light may pass through the polarization combiner 222 and the wavelength combining device 212 corresponding to emitted light and then be emitted to the optical fiber of an output unit.

Figure 5:
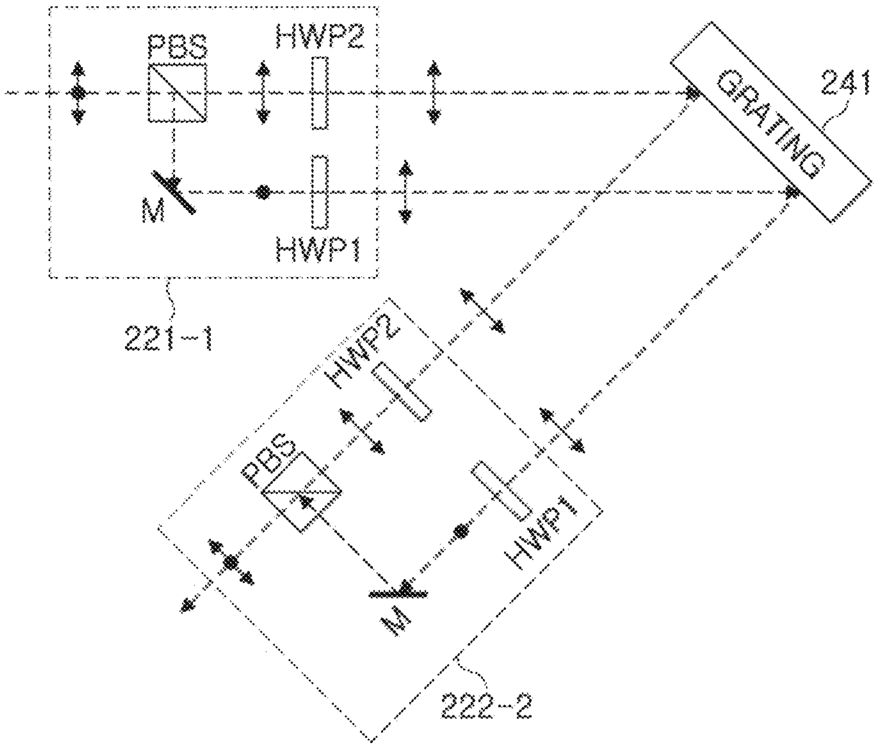
FIG. 5 is a diagram illustrating an operation of a polarizing beam splitter according to one or more embodiments.

FIG. 5 is a diagram illustrating an operation of a polarizing beam splitter according to one or more embodiments. Referring to FIG. 5, each of first and second polarization optics 221-1 and 222-1 may include the polarizing beam splitter PBS, the mirror M, and first and second polarization control devices HWP1 and HWP2. Light may be optimally separated according to the dependence of a corresponding grating 241 using the polarization control device HWP1 or HWP2.

In one or more embodiments, the first optical polarization instrument 221-1 may include the polarizing beam splitter PBS that outputs transmitted light and reflected light by separating collimated beam into polarization beams orthogonal to each other, the mirror M that reflects the reflected light, the first polarization adjustor HWP1 that adjusts polarization of the reflected light of the mirror M, and the second polarization adjustor HWP2 that adjusts polarization of the transmitted light of the polarizing beam splitter PBS.

In one or more embodiments, the second optical polarization instrument 222-2 may include the first polarization adjustor HWP1 that adjusts polarization of first diffracted light of the diffraction grating 241, the second polarization adjustor HWP2 that adjusts polarization of second diffracted light of the diffraction grating 241, the mirror M that reflects the adjusted polarization of the first polarization adjustor HWP1, and a polarization combiner that combines the polarization reflected from the mirror M with the adjusted polarization of the second polarization adjustor HWP2.

A broadband spectrometer adds the number of gratings to minimize the wavelength and polarization dependence of the grating efficiency. However, the addition of the number of gratings causes an increase in the driving time and an increase in the size of each of a grating mount and a driving unit. Also, the broadband spectrometer 200 according to one or more embodiments may facilitate an increase in the number of gratings without a relative increase in the system size. In addition, the broadband spectrometer 200 according to one or more embodiments may be implemented as an ultra-wideband spectrometer that covers the entire broadband range from ultraviolet to infrared.

Figure 6:
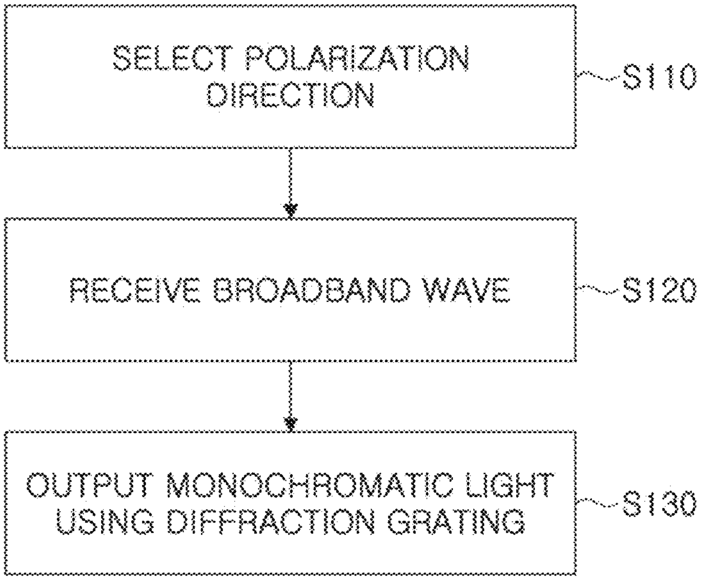
FIG. 6 is a diagram illustrating an operation of a monochromator according to one or more embodiments.

FIG. 6 is a diagram illustrating an operation of the monochromator 100 according to one or more embodiments. Referring to FIG. 6, the operation method of the monochromator 100 according to one or more embodiments is illustrated. The monochromator 100 may select the optimal polarization for output monochromatic light (operation S110). For example, with respect to polarization of the output monochromatic light that maximizes the grating efficiency, either P-polarization or S-polarization may be selected. Thereafter, broadband light may be received by the monochromator 100 through an optical fiber (operation S120). Thereafter, monochromatic light may be output using a multi-grating mount having diffraction gratings that diffract collimated beams in a polarization direction. The monochromatic light may be output by splitting a light source of multiple wavelengths using a wavelength and polarization separating/combining module (operation S130).

In one or more embodiments, the light source of multiple wavelengths may be separated into collimated beams corresponding to a plurality of wavelength bands, and the separated collimated beams may be output to spaces (areas) corresponding to the plurality of wavelength bands. In one or more embodiments, each of the separated collimated beams may be separated into orthogonal polarization beams, and the separated polarization beams may be adjusted in selected polarization directions. In one or more embodiments, the adjusted polarization beams may be diffracted in the corresponding diffraction gratings, and the diffracted polarization beams may be adjusted as different polarization beams. In one or more embodiments, the adjusted polarization beams may be combined by a polarization combiner.

Figure 7:
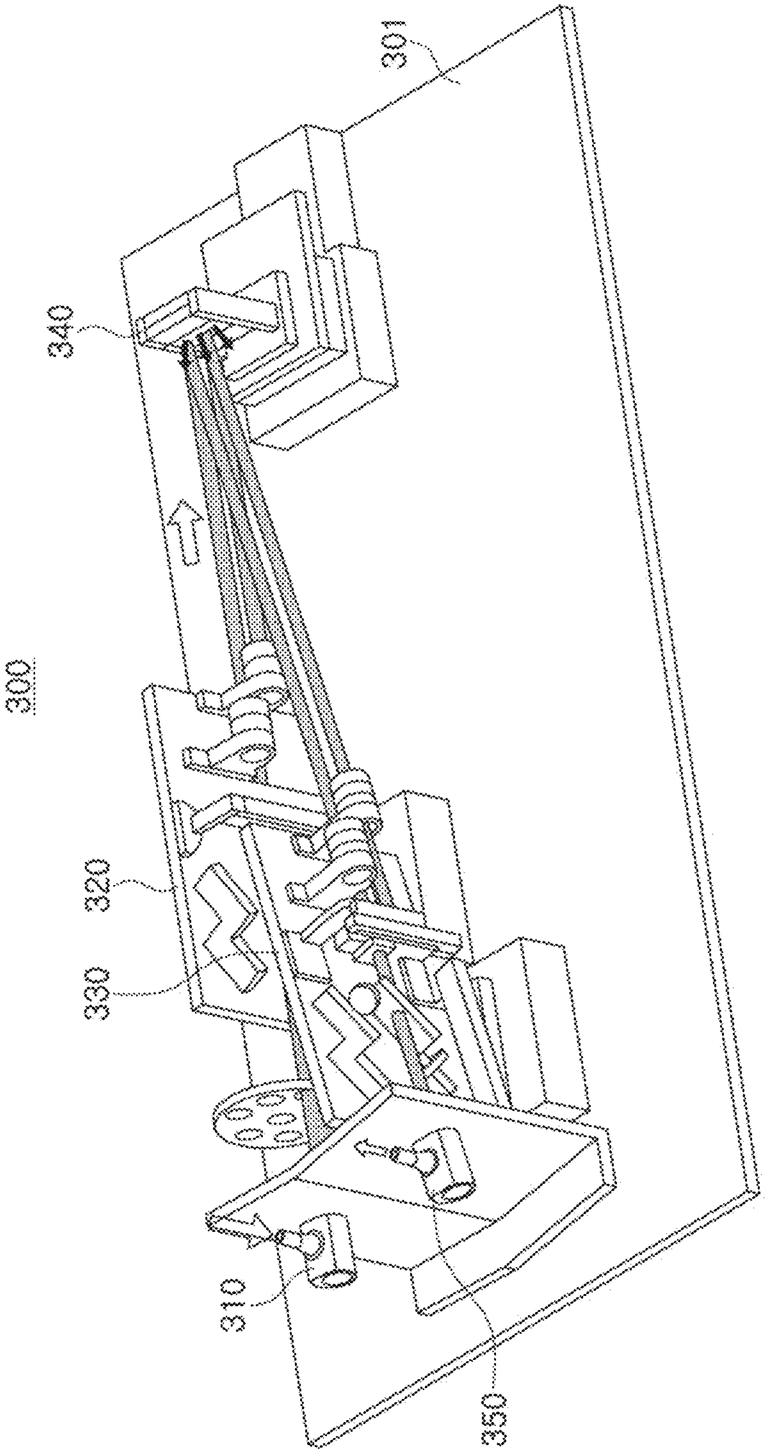
FIG. 7 is a diagram illustrating a monochromator according to one or more embodiments.

FIG. 7 is a diagram illustrating a monochromator 300 according to one or more embodiments. Referring to FIG. 7, the monochromator 300 may include an incident light unit 310, a first wavelength and polarization separating/combining module 320, a second wavelength and polarization separating/combining module 330, a multi-grating unit 340, and an emitted light unit 350.

In one or more embodiments, the first wavelength and polarization separating/combining module 320 may be implemented as the wavelength separator 120 and the polarization optics 131, 132, and 133 shown in FIG. 2. In one or more embodiments, the second wavelength and polarization separating/combining module 330 may be implemented as the wavelength combiner 150 and the polarization optics 134, 135, and 136 shown in FIG. 2.

The monochromator 300 according to one or more embodiments may increase a grating bandwidth by minimizing the polarization dependence of a multi-wavelength grating (i.e., by optimizing polarization of incident light).

Figure 8:
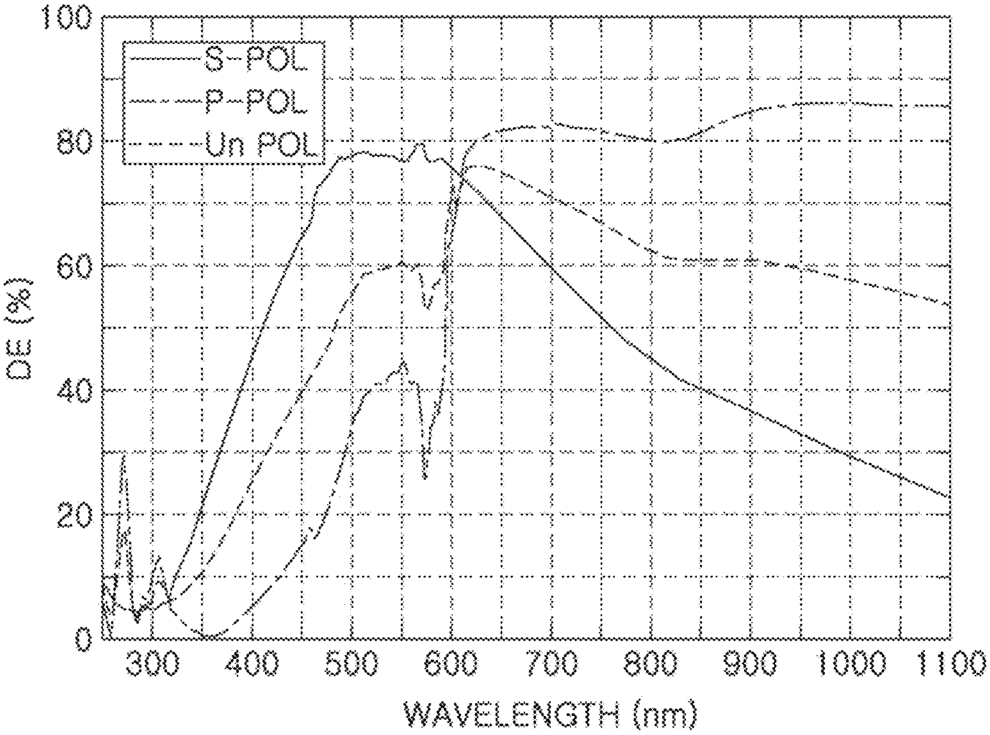
FIG. 8 is a diagram illustrating optimal diffraction efficiency according to a polarization state of a monochromator according to one or more embodiments.

FIG. 8 is a diagram illustrating optimal diffraction efficiency (DE) according to a polarization state of a monochromator according to one or more embodiments. As shown in FIG. 8, by comparing the graphs of S-polarization, P-polarization, and un-polarization, in the case of a multi-wavelength grating, DE dependence on wavelength and incident polarization is relatively high. The monochromator according to one or more embodiments may allow light of polarization having optimal efficiency for each wavelength to be incident on a grating using an optical polarization instrument, thereby minimizing polarization dependence (effect). Accordingly, a monochromator with relatively high efficiency may be implemented without increasing the number of gratings.

Figure 9:
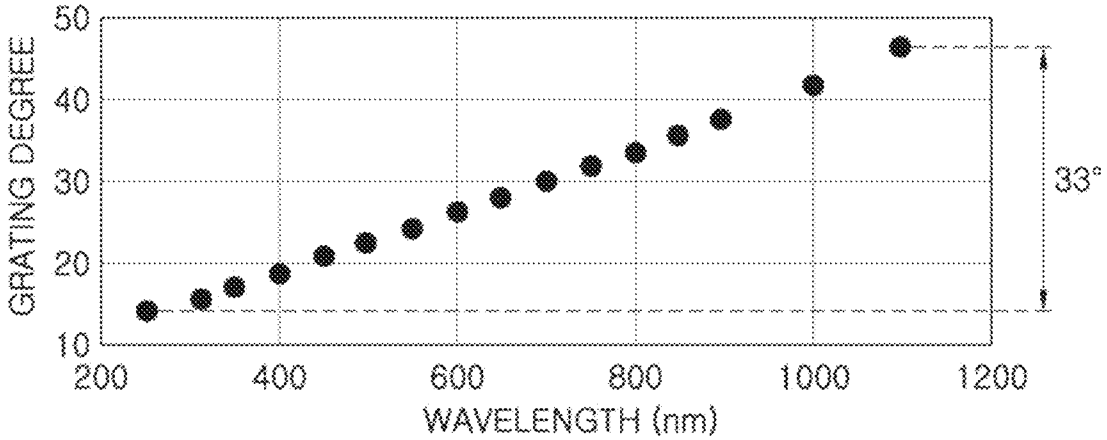
FIG. 9 is a diagram illustrating that a full-wavelength scanning time is reduced by avoiding physical replacement of a diffraction grating in a monochromator according to one or more embodiments.

FIG. 9 is a diagram illustrating that a full-wavelength scanning time is reduced by avoiding physical replacement of a diffraction grating in a monochromator according to one or more embodiments. In the case of the existing multi-wavelength monochromator, turret-type mounts are used to simultaneously use several gratings due to the limitation of a diffraction wavelength band of a grating. When using a triangular turret with three gratings mounted to implement a broadband (250 nm to 1100 nm) monochromator, a rotation angle of at least 240° is required to scan the entire wavelength band. Also, in the case of the monochromator according to one or more embodiments, all gratings may be placed on a multi-grating mount having the same rotation axis, and thus, no additional rotation for grating use is required.

The monochromator according to one or more embodiments has a driving angle of 1/7 (in the case of ~33°, pitch 1200 gr/mm) compared to the existing monochromator. Considering a stabilization time for each grating rotation, the time required to scan the entire wavelength band may be reduced to at least 1/7 or less compared to the existing turret type.

Figure 10:
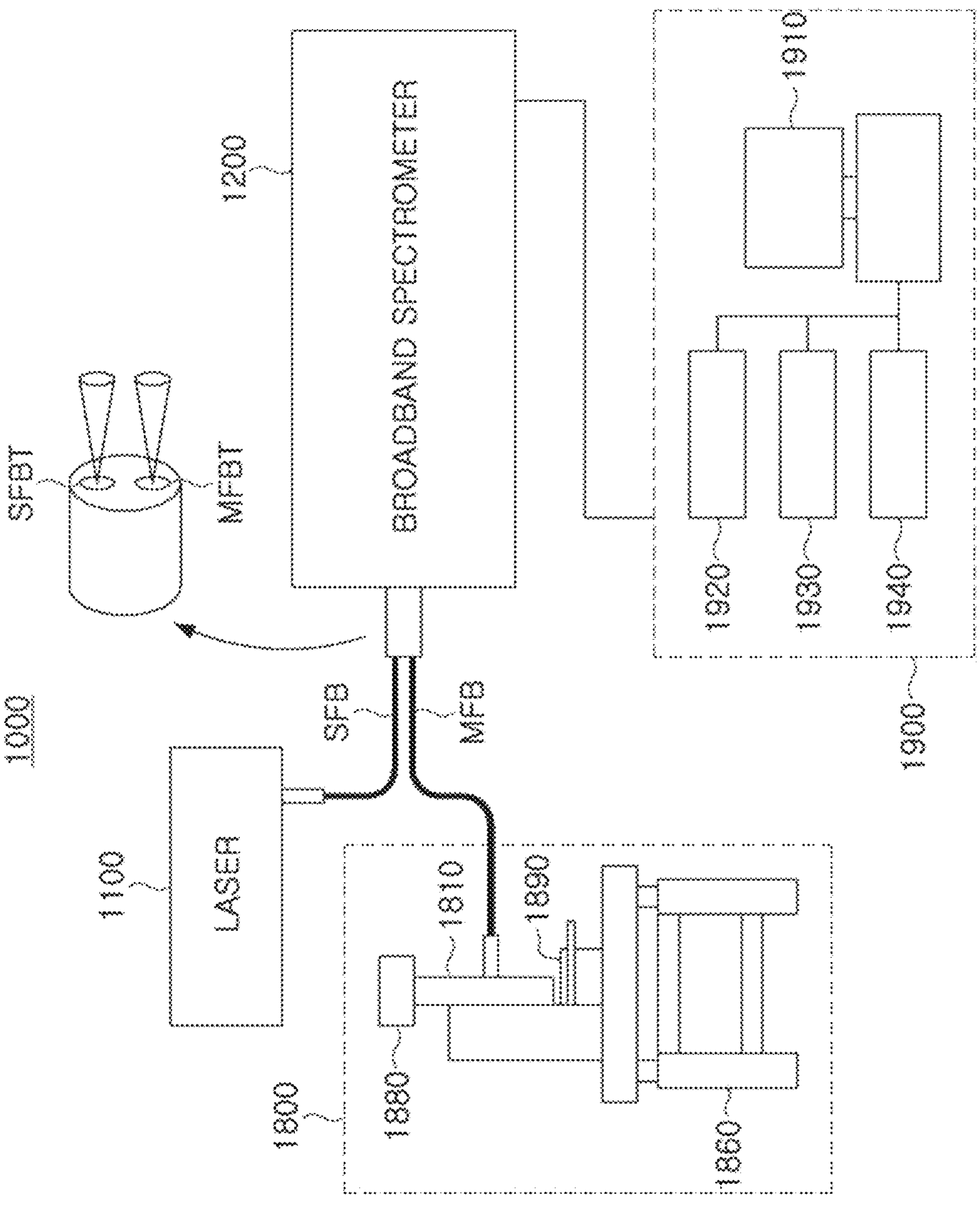
FIG. 10 is a diagram illustrating a semiconductor measurement system according to one or more embodiments.

FIG. 10 is a diagram illustrating a semiconductor measurement system 1000 according to one or more embodiments. Referring to FIG. 10, the semiconductor measurement system 1000 may include a light source 1100, a broadband spectrometer 1200, a measurement device 1800, and a computing device 1900.

The light source 1100 may be implemented to generate a broadband light source. The light source 1100 may be implemented as a SC laser. The light source 1100 is connected to a single mode fiber SFB. Light generated by the light source 1100 is emitted from a single mode fiber tangential SFBT through the single mode fiber SFB. The single mode fiber tangential SFBT may also serve as an incidence slit of the broadband spectrometer 1200. As described above, the light may include laser light emitted from a fiber, and the incidence slit may include a tangential of the fiber. When using high-output white light using plasma as a broadband light source, a connection optical fiber becomes a multi-mode fiber MFB.

The broadband spectrometer 1200 disperses the incident light and emits light of a target wavelength from an emission slit as emitted light. The light emitted from the broadband spectrometer 1200 is incident on the multi-mode fiber MFB. In addition, a multimode fiber tangential MFBT, which is an entrance to the multi-mode fiber MFB, may also serve as an emission slit of the broadband spectrometer 1200. The split light incident on the multimode fiber tangential MFBT is incident on an optical system 1810 in the measurement device 1800 through the multi-mode fiber MFB. Also, the light is used for a necessary measurement or inspection. In addition, the broadband spectrometer 1200 may be implemented using the monochromator and the operating method thereof described with reference to FIGS. 1 to 9.

The measurement device 1800 inspects or measures a sample 1890 using the light emitted from the broadband spectrometer 1200. The sample 1890 is, for example, a semiconductor such as a semiconductor substrate or semiconductor circuit. In addition, the sample 1890 may be a member other than the semiconductor. The measurement device 1800 includes the optical system 1810 and an image detector 1880. The measurement device 1800 may further include a base, an isolator, an optical plate, a frame, a stage, and a wafer holder.

The optical system 1810 may be mounted on the frame, and the frame may be fixed to the optical plate. The optical plate may be placed on the base. The isolator may be disposed between the optical plate and the base. The stage may drive the wafer holder supporting the sample 1890. The wafer holder holding the sample 1890 may be placed on the stage. The stage may be placed below the optical system 1810. The measurement device 1800 captures an image of the sample 1890 with the image detector 1880 using the optical system 1810. Accordingly, the measurement device 1800 inspects or measures physical information of the sample 1890.

The computing device 1900 includes, for example, an information processing device, such as a computer 1910. In addition to the computer 1910, the computing device 1900 includes, for example, a digital micro mirror device (DMD) control unit 1920, an image detection control unit 1930, and a stage control unit 1940. The DMD control unit 1920 controls an operation of a DMD. The image detection control unit 1930 controls an operation of the image detector 1880. The stage control unit 1940 controls an operation of a stage 1860.

The measurement device 1800 may inspect or measure the sample 1890 by independently using light including a plurality of wavelengths emitted from the broadband spectrometer 1200. In addition, the measurement device 1800 may perform measurement.

The devices described above may be implemented as hardware components, software components, and/or a combination of hardware components and software components. For example, the devices and components described in the embodiment may be implemented using one or more general-purpose or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The computing device 1900 may run an operating system (OS) and one or more software applications running on the OS. In addition, the computing device 1900 may access, store, manipulate, process, and generate data in response to the execution of software. For ease of understanding, it is described that one computing device 1900 is used, but those skilled in the art may be known that the computing device 1900 may include a plurality of processing elements or a plurality of types of processing elements. For example, the computing device 1900 may include a plurality of processors or one processor and one controller. In addition, other processing configurations, such as a parallel processor, are possible.

Software may include a computer program, code, instructions, or a combination of one or more of these, and may configure the computing device 1900 to operate as desired, or may independently or collectively instruct the computing device 1900. Software and/or data may be embodied in any type of machine, a component, a physical device, virtual equipment, computer storage medium, or a device so as to be interpreted by the computing device 1900 or provide commands or data to the computing device 1900. Software may be distributed over computer systems connected over a network and stored or executed in a distributed manner. Software and data may be stored on one or more computer-readable recording media.

Due to increased structural complexity (miniaturization, three-dimensional (3D) integration), ensuring measurement integrity of existing Optical Critical Dimension (OCD) is challenging. In this context, one or more embodiments may be applied to next-generation OCD (CSI, Continuous-angle spectroscopic information for ellipsometry) capable of capturing more information (Azimuth, AOI) at once compared to related OCD. This is achieved through the application of broadband (250~1100 nm) monochromator light source technology. Furthermore, since the wavelength range showing good OCD alignment may vary depending on the structure and properties of the pattern, a wider broadband light source is needed to selectively adapt to more diverse and fine patterns. The one or more embodiments enable inspection and measurement for all wavelength ranges within a single facility without replacing the light source or measurement equipment for wavelength range changes.

According to one or more embodiments, the semiconductor measurement system and an operating method thereof may eliminate the wavelength/polarization dependence of the output of monochromatic light used in semiconductor measurement.

According to one or more embodiments, the semiconductor measurement system and an operating method thereof may remove a grating switching time delay using a multi-grating mount when splitting light of multiple wavelengths.

While embodiments have been described with reference to the figures, it will be understood by those of ordinary skill in the art that various changes in form and details may be made therein without departing from the spirit and scope as defined by the following claims and their equivalents.

What is claimed is:

1. A semiconductor measurement system comprising:

a monochromator comprising:

a first wavelength control device configured to separate a collimated beam comprising multiple wavelengths into a plurality of wavelength bands;

a second wavelength control device configured to receive diffracted light beams corresponding to the plurality of the wavelength bands and output one of the diffracted light beams as a collimated beam of a single wavelength;

first polarization optics configured to separate respective separated light beams corresponding to the plurality of the wavelength bands into two polarization beams orthogonal to each other and match polarization directions of separated polarization beams;

second polarization optics configured to output the diffracted light beams corresponding to the plurality of the wavelength bands by separating each of the diffracted light beams having matched polarization direction into two polarization beams orthogonal to each other and combining the separated polarization beams; and a multi-grating mount comprising diffraction gratings configured to output the diffracted light beams having the matched polarization direction by diffracting each of the polarization beams having the matched polarization direction output from the first polarization optics, wherein the multi-grating mount is configured to be rotated to scan the plurality of the wavelength bands.

2. The semiconductor measurement system of claim 1, wherein the monochromator further comprises:

an optical fiber configured to receive broadband incident light; and a collimator configured to output light output from the optical fiber to the first wavelength control device as the collimated beam of the multiple wavelengths.

3. The semiconductor measurement system of claim 1, wherein the monochromator further comprises:

a collimator configured to receive the collimated beam of the single wavelength from the second wavelength control device; and an output light unit comprising an optical fiber configured to couple the collimated beam of the collimator.

4. The semiconductor measurement system of claim 1, wherein the first wavelength control device is configured to output the separated light beams to first areas corresponding to the plurality of the wavelength bands based on at least one first bandpass filter and at least one first mirror, and wherein the second wavelength control device is configured to output the diffracted light beams in second areas corresponding to the plurality of the wavelength bands as the collimated beam of the single wavelength based on at least one second bandpass filter and at least one second mirror.

5. The semiconductor measurement system of claim 4, wherein transmitted light of the at least one first bandpass filter and reflected light of the at least one first mirror are parallel to each other, and wherein transmitted light of the at least one second bandpass filter and reflected light of the at least one second mirror are parallel to each other.

6. The semiconductor measurement system of claim 1, wherein each of the first polarization optics comprises:

a polarizing beam splitter configured to output transmitted light and reflected light by separating the collimated beam into polarization beams orthogonal to each other;

a mirror configured to reflect the reflected light;

a first polarization controller configured to adjust a polarization of the reflected light of the mirror; and a second polarization controller configured to adjust a polarization of the transmitted light of the polarizing beam splitter.

7. The semiconductor measurement system of claim 1, wherein each of the second polarization optics comprises:

a first polarization controller configured to adjust a polarization of first diffracted light of the diffraction gratings;

a second polarization controller configured to adjust a polarization of second diffracted light of the diffraction gratings;

a mirror configured to reflect the adjusted polarization of the first polarization controller; and a polarization combiner configured to combine the polarization reflected from the mirror with the adjusted polarization of the second polarization controller.

8. The semiconductor measurement system of claim 7, wherein the first polarization controller and the second polarization controller each comprise a half-wave plate (HWP).

9. The semiconductor measurement system of claim 1, wherein the multi-grating mount is configured to mount the diffraction gratings in parallel, and wherein a pitch of the diffraction gratings is equal to a distance between grating lines, and a blaze angle of each of the diffraction gratings are different from each other.

10. A semiconductor measurement system comprising:

a monochromator comprising:

an incident collimator configured to receive incident light of multiple wavelengths;

a beam splitter configured to split the incident light of the multiple wavelengths into light beams corresponding to a plurality of wavelength bands; and an emitted collimator configured to output one of split light beams as emitted light of a single wavelength, wherein a light splitting unit comprises:

a wavelength control device configured to output separated collimated beams into areas respectively corresponding to the plurality of the wavelength bands or combine diffracted light beams corresponding to the plurality of the wavelength bands;

polarization optics configured to separate each of the collimated beams into orthogonal polarization beams, match polarization directions of separated polarization beams, and output diffracted light beams of the same wavelength in different optical paths as diffracted light beams having polarization beams orthogonal to each other; and a multi-grating mount having a plurality of diffraction gratings respectively corresponding to the plurality of the wavelength bands, the plurality of the diffraction gratings being configured to diffract the collimated beams having matched polarization direction, wherein the multi-grating mount further comprises a rotation stage configured to rotate each of the plurality of the diffraction gratings.

11. The semiconductor measurement system of claim 10, wherein the wavelength control device comprises:

a wavelength separating device configured to separate the collimated beams into the areas corresponding to the plurality of the wavelength bands; and a wavelength combining device configured to combine the diffracted light beams corresponding to the plurality of the wavelength bands.

12. The semiconductor measurement system of claim 10, wherein the polarization optics comprise:

a polarizing beam splitter configured to separate each of the collimated beams into the orthogonal polarization beams and match the polarization directions of the separated polarization beams; and a polarization combiner configured to output the diffracted light beams having equal wavelength in the different optical paths as the diffracted light beams having the polarization beams orthogonal to each other.

13. The semiconductor measurement system of claim 12, wherein the polarization direction is determined based on the single wavelength.

14. A semiconductor measurement system comprising:

a laser configured to output a light having multiple wavelengths;

a broadband spectrometer configured to receive the light and output monochromatic light having a single wavelength;

a measurement device configured to obtain physical information of a sample based on the monochromatic light; and a computing device configured to inspect or measure the sample based on obtained physical information, wherein the broadband spectrometer is further configured to remove polarization dependence of the light based on a wavelength and a polarization separating/combining device, wherein the broadband spectrometer comprises:

a wavelength control device configured to output separated collimated beams into areas respectively corresponding to a plurality of wavelength bands or combine diffracted light beams corresponding to the plurality of the wavelength bands;

polarization optics configured to separate each of the collimated beams into orthogonal polarization beams, match polarization directions of separated polarization beams, and output diffracted light beams of same wavelength in different optical paths as diffracted light beams having polarization beams orthogonal to each other; and a multi-grating mount comprising a plurality of diffraction gratings respectively correspond to the plurality of the wavelength bands, the plurality of the diffraction gratings being configured to diffract the collimated beams having matched polarization direction, and wherein the multi-grating mount further comprises a rotation stage configured to rotate each of the plurality of the diffraction gratings.

15. The semiconductor measurement system of claim 14, wherein each of the plurality of the diffraction gratings is on one plane.

16. The semiconductor measurement system of claim 14, wherein an optical efficiency based on an incident wavelength among the orthogonal polarization beams is highest in the matched polarization direction.

17. The semiconductor measurement system of claim 14, wherein the multi-grating mount is configured to rotate at a driving angle less than or equal to 33°.

* * * * *